(12) United States Patent
Gafni

(10) Patent No.: US 11,310,115 B2
(45) Date of Patent: Apr. 19, 2022

(54) TCLOS—SCALABLE NETWORK TOPOLOGY AND SYSTEM ARCHITECTURE

(71) Applicant: MELLANOX TECHNOLOGIES TLV LTD., Raanana (IL)

(72) Inventor: Barak Gafni, Campbell, CA (US)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 225 days.

(21) Appl. No.: 16/878,763

(22) Filed: May 20, 2020

(65) Prior Publication Data

US 2021/0367850 A1 Nov. 25, 2021

(51) Int. Cl.
*H04L 49/10* (2022.01)
*H04L 49/15* (2022.01)
*H04L 41/12* (2022.01)
*H04L 45/48* (2022.01)
*H04L 41/0803* (2022.01)
*H04L 49/00* (2022.01)
*G06F 21/76* (2013.01)
*H04L 49/65* (2022.01)
*H04L 49/25* (2022.01)
*H04L 49/1515* (2022.01)

(52) U.S. Cl.
CPC .............. *H04L 41/12* (2013.01); *G06F 21/76* (2013.01); *H04L 41/0803* (2013.01); *H04L 45/48* (2013.01); *H04L 49/10* (2013.01); *H04L 49/1515* (2013.01); *H04L 49/25* (2013.01); *H04L 49/65* (2013.01); *H04L 49/70* (2013.01)

(58) Field of Classification Search
CPC ..... H04L 41/12; H04L 41/08; H04L 41/0803; H04L 45/48; H04L 49/10; H04L 49/15; H04L 49/1515; H04L 49/25; H04L 49/65; H04L 49/70
See application file for complete search history.

(56) References Cited

U.S. PATENT DOCUMENTS

| | | | |
|---|---|---|---|
| 8,570,865 B2 | 10/2013 | Goldenberg et al. |
| 8,576,715 B2 | 11/2013 | Bloch et al. |
| 9,014,006 B2 | 4/2015 | Haramaty et al. |
| 9,137,143 B2 | 9/2015 | Parker et al. |
| 9,544,185 B1 | 1/2017 | Yadav et al. |
| 9,571,421 B1 | 2/2017 | Brar et al. |
| 9,634,940 B2 | 4/2017 | Haramaty et al. |
| 10,644,995 B2 | 5/2020 | Levy et al. |
| 11,050,679 B1 * | 6/2021 | Przygienda ......... H04L 49/1569 |

(Continued)

OTHER PUBLICATIONS

Leiserson et al., "Fat-Trees: Universal Networks for Hardware Efficient Supercomputing", IEEE Transactions on Computers, vol. C-34, No. 10, pp. 892-901, Oct. 1985.

(Continued)

*Primary Examiner* — Kent Krueger
(74) *Attorney, Agent, or Firm* — Kligler & Associates Patent Attorneys Ltd

(57) ABSTRACT

In one embodiment, a computer network system, includes a plurality of mesh networks, each mesh network including at least three interconnected respective internal switches with each respective internal switch being connected to each other one of the respective internal switches via a respective internal network connection, and Clos topology network connections connecting the mesh networks in a Clos topology arrangement.

19 Claims, 7 Drawing Sheets

(56) References Cited

U.S. PATENT DOCUMENTS

| | | | |
|---|---|---|---|
| 2014/0247829 A1* | 9/2014 | Gautam | H04L 29/0653 |
| | | | 370/392 |
| 2015/0124631 A1 | 5/2015 | Edsall et al. | |
| 2015/0124817 A1 | 5/2015 | Merchant et al. | |
| 2015/0127797 A1 | 5/2015 | Attar et al. | |
| 2015/0131663 A1* | 5/2015 | Brar | H04L 45/745 |
| | | | 370/392 |
| 2017/0054445 A1 | 2/2017 | Wang | |
| 2017/0181315 A1 | 6/2017 | Gafni et al. | |
| 2017/0187629 A1* | 6/2017 | Shalev | H04L 47/125 |
| 2018/0316613 A1* | 11/2018 | Gafni | H04L 12/44 |
| 2020/0313956 A1 | 10/2020 | Heitz et al. | |

OTHER PUBLICATIONS

Levy et al., U.S. Appl. No. 16/816,308, filed Dec. 3, 2020.

* cited by examiner

TCLOS—SCALABLE NETWORK TOPOLOGY AND SYSTEM ARCHITECTURE

FIELD OF THE INVENTION

The present invention relates to computer networks, and in particular, but not exclusively to, a scalable network topology.

BACKGROUND

Datacenters are the storage and data processing hubs of the internet. The massive deployment of cloud applications is causing datacenters to expand exponentially in size, stimulating the development of faster switches in order to cope with the increasing data traffic inside the datacenter. Current state-of-the-art switches are capable of handling 12.8 Tb/s of traffic by employing application specific integrated circuits (ASICs) equipped with 256 data lanes, each operating at 50 Gb/s (gigabits per second). Such switch ASICs typically consume hundreds of watts (W), whereas the power consumption of the optical transceiver interfaces attached to the ASIC is comparable.

To keep pace with traffic demand, switch capacity has to be doubled every approximately two years. So far, this rapid scaling was possible by exploiting advances in CMOS (Complementary Metal Oxide Semiconductor) manufacturing, collectively described by Moore's law (i.e. the observation that the number of transistors in a dense integrated circuit doubles about every two years). However, in recent years there are strong indications of Moore's law slowing down, which raises concerns as per the capability to sustain the target scaling rate of switch capacity. Alternative technological approaches have been identified, such as the co-integration of photonics and electronics in multi-chip modules, which are expected to enable the development of datacenter switches with up to 100 Tb/s (terabits per second) capacity. However, it is expected that further scaling will become harder without conceptual changes. As a result, alternative technologies are being investigated.

A common way to scale switch bandwidth and radix is to connect multiple switches, for example in a Clos-topology network, also referred to as a CBB or fat-tree network. Various types of switching networks are known in the art. Some of these types have hierarchical topologies, meaning that the switches in the network are connected together in multiple stages (or levels). A signal input at one of the edge ports of the switching network, at the bottom of the hierarchy, generally pass through one or more internal stages, at higher levels in the hierarchy, before reaching another edge port from which it is output. Some hierarchical networks are non-blocking, in the sense that any unused edge port can always be connected to any other unused edge port, regardless of existing connections within the network.

A Clos topology network is a kind of hierarchical switching network, which is made up of crossbar switches arranged in interconnected stages. Clos topology networks were originally defined by Leiserson in "Fat-Trees: Universal Networks for Hardware Efficient Supercomputing," IEEE Transactions on Computers C-34(10), pages 892-901 (1985), and are now widely used in parallel and distributed computing architectures. Further aspects of Clos topology networks are described, for example, in U.S. Pat. No. 8,570,865, whose disclosure is incorporated herein by reference.

In a Clos topology network, computing nodes are connected to leaf switches at the edge of the network, and the leaf switches are interconnected by links to spine switches arranged in multiple hierarchical levels inside the network. The numbers of spine switches and links at each level are chosen so as to provide sufficient bandwidth between the spine switches to enable multiple computing nodes (or all of the computing nodes) to exchange messages via the network concurrently. The term "Clos topology" is used broadly in the art to define any and all types of communication networks meeting the above criteria and includes extended and generalized types of Clos topology networks.

For example, US Patent Publication 2017/0054445 of Wang et al., describes an integrated circuit comprising a plurality of switch matrices wherein the plurality of switch matrices are arranged in stages including (i) a first stage, configured in a hierarchical network (for example, a radix-4 network), (ii) a second stage configured in a hierarchical network (for example, a radix-2 or radix-3 network) and coupled to switches of the first stage, and (iii) a third stage configured in a mesh network and coupled to switches of the first or second stages or both of them.

US Patent Publication 2019/0253345 of Levy, et al., describes a network box connected in a communication network, including a first tier of leaf switches having ingress ports and egress ports, configured to exchange packets, a second tier of spine switches having ingress ports and egress ports, and configured to exchange the packets with the first tier, and first packet processing circuitry, configured to adaptively route the packets from the first tier to the second tier, and second packet processing circuitry configured to statically route the packets from the second tier to the first tier.

SUMMARY

There is provided in accordance with an embodiment of the present disclosure, a computer network system, including a plurality of mesh networks, each mesh network including at least three interconnected respective internal switches with each respective internal switch being connected to each other one of the respective internal switches via a respective internal network connection, and Clos topology network connections connecting the mesh networks in a Clos topology arrangement.

Further in accordance with an embodiment of the present disclosure the respective internal switches include respective application-specific integrated circuits (ASICs) configured to forward packets responsively to packet destinations in the respective internal switches.

Still further in accordance with an embodiment of the present disclosure each ASIC consists of network ports, each of the ports using a same forwarding protocol.

Additionally, in accordance with an embodiment of the present disclosure each mesh network consists of three of the respective internal switches.

Moreover in accordance with an embodiment of the present disclosure, the system includes a plurality of network switch devices connected via the Clos topology network connections, the Clos topology arrangement including a lower tier and an upper tier, the network switch devices including leaf switch devices disposed in the lower tier, and spine switch devices disposed in the upper tier, each of the leaf switch devices being connected by respective ones of the network connections to the spine switch devices, respective ones of the leaf switch devices including respective mesh switch devices, each mesh switch device including a respective one of the mesh networks.

Further in accordance with an embodiment of the present disclosure each mesh switch device consists of three of the respective internal switches.

Still further in accordance with an embodiment of the present disclosure respective ones of the spine switch devices include respective ones of the mesh switch devices.

Additionally, in accordance with an embodiment of the present disclosure each of the network switch devices includes a respective one of the mesh switch devices.

Moreover, in accordance with an embodiment of the present disclosure each respective mesh switch device includes a respective enclosure with the three respective internal switches disposed in the respective enclosure.

Further in accordance with an embodiment of the present disclosure each respective mesh switch device includes a respective cooling system disposed in the respective enclosure to remove heat generated by the three respective internal switches from the respective enclosure.

Still further in accordance with an embodiment of the present disclosure respective ones of the spine switch devices include respective ones of the mesh switch devices.

Additionally, in accordance with an embodiment of the present disclosure respective ones of the network switch devices include respective ones of the mesh switch devices.

Moreover, in accordance with an embodiment of the present disclosure each of the network switch devices includes a respective one of the mesh switch devices.

Further in accordance with an embodiment of the present disclosure each respective mesh switch device includes a respective enclosure with the at least three respective internal switches disposed in the respective enclosure.

Still further in accordance with an embodiment of the present disclosure each respective mesh switch device includes a respective cooling system disposed in the respective enclosure to remove heat generated by the at least three respective internal switches from the respective enclosure.

Additionally, in accordance with an embodiment of the present disclosure the Clos topology arrangement includes at least three tiers.

Moreover, in accordance with an embodiment of the present disclosure each mesh network includes respective internal forwarding elements, and is configured to implement adaptive routing between the respective internal forwarding elements of a respective one of the mesh networks.

Further in accordance with an embodiment of the present disclosure each mesh network includes a central processing unit configured to provide shared services to the at least three respective internal switches.

Still further in accordance with an embodiment of the present disclosure the respective internal switches in each respective mesh network includes ports, a first half of the ports of the respective internal switches are connected to nodes external to the respective mesh network, and a second half of the ports of the respective internal switches are directly connected to each of other ones of the respective internal switches in the respective mesh network with equal distribution among the respective internal switches.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
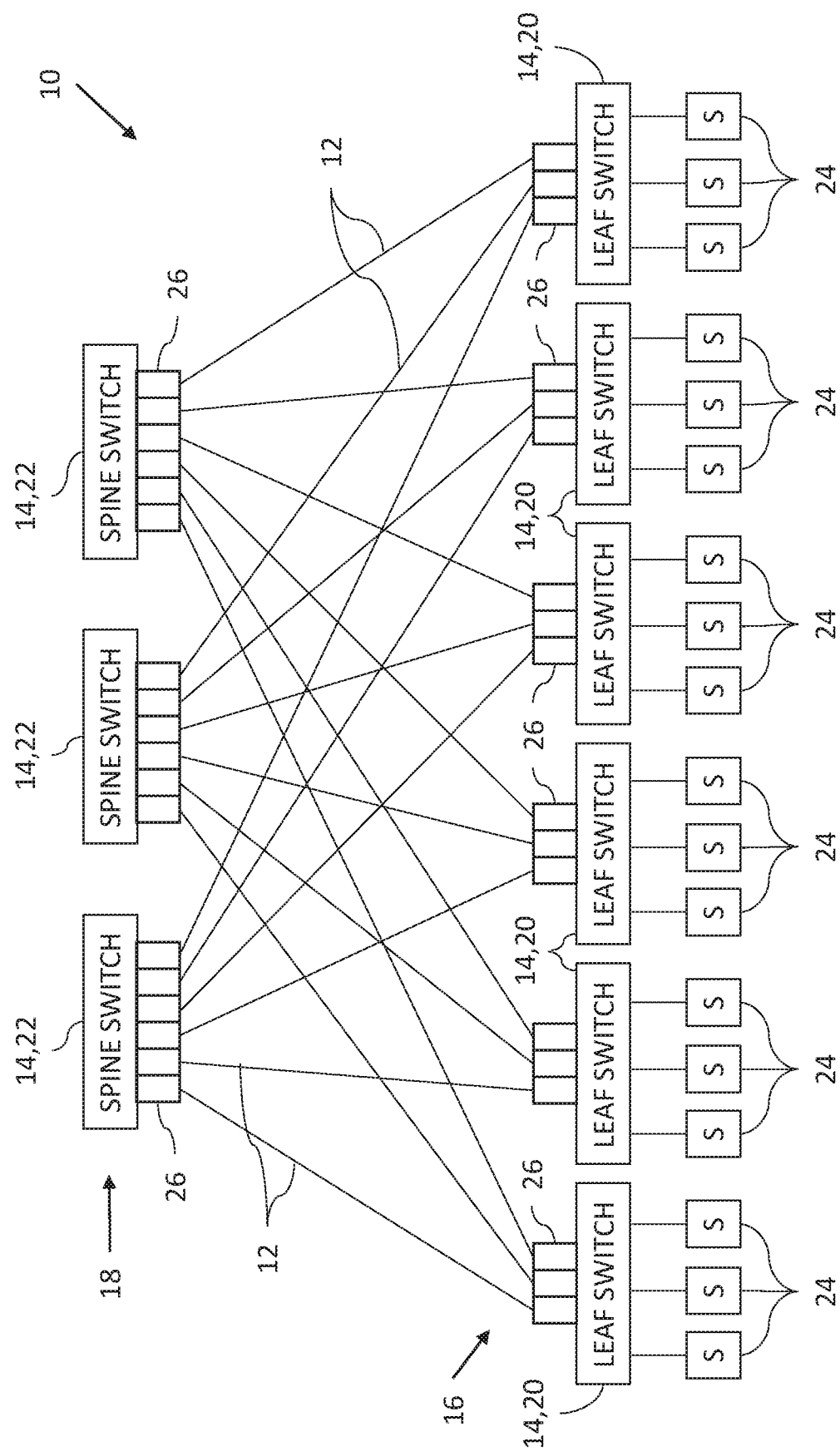
FIG. 1 is a block diagram view of a computer network system constructed and operative in accordance with an embodiment of the present invention.

Scaling up switching solutions for networks have become more challenging as network bandwidth needs are growing faster than gains provided by newer silicon production processes. As most modern networks use a Clos topology or variants thereof, which rely on high-radix switches, there is a need to keep scaling up switch radix.

Another problem in modern networks is large number of switches needed to connect a collection of servers. Large numbers of switches use a lot of power to operate the switch.

Embodiments of the present invention solve the above problems by providing a novel network topology, which instead of growing the die size of the switch application-specific integrated-circuit (ASIC) (or other switch building block), efficiently connects internal switches (e.g., multiple dies or multiple packages) together within a single network switch device to form a higher-radix building block, in order to be able to scale the network size more efficiently. The internal switches are connected together in a mesh network, thereby forming a mesh switch device. Mesh switch devices may then be deployed in any suitable network topology, for example, but not limited to, a Clos topology. The mesh switch devices deployed in a Clos topology may be thought of as connecting multiple mesh networks together in a Clos topology.

The mesh switch device may include three or more internal switches. In some embodiments, the mesh switch device includes only three internal switches thereby enabling implementation of a non-blocking mesh switch device. Using more than three internal switches is possible, but does not ensure that the mesh switch device is non-blocking when half of the ports of each internal switch (e.g., ASIC) of that mesh switch device are used as external ports for connection to nodes outside of that mesh switch device.

By way of example, using a 40-radix switch, a two-tier network can connect 800 servers (20×40, according to K*(K/2), where K is the radix of a switch unit) or a pod of 400 servers (20×20). The term "pod", as used in the specification and claims, is defined as a network that delivers both inter-server connectivity as well as full connectivity to other networks.

In contrast, embodiments of the present invention provide a network topology using mesh switch devices, with each mesh switch device including three internal switches of 40 port radix each giving a total radix of 60 per mesh switch device. Therefore, a two-tiered cluster can connect 1800 servers (30×60, according to (K/2^2)) or a pod of 900 servers (30×30). This uses 50% more switch "boxes" than the above example, but provides connectivity to more than twice the number of servers (1800 as compared to 800).

Even though each mesh switch device includes more internal switches and therefore 50% more switch "boxes" means many more internal switches (e.g., ASICs), using more ASICs is a small part of the cost of the switch "box" as most of the cost of a switch device is due to cooling systems (e.g., fans), shipping costs, CPUs, etc., which in most cases is not so dependent on the number of ASICs in the box.

Additionally, the mesh switch device provides 50% more ports by using 200% more internal switches (e.g., ASICs). In contrast, a Clos topology switch also known as a "Clos in a box" switch may provide 100% more ports by using 500% more internal switches.

Apart from providing a higher number of connected servers, embodiment of the present invention may also provide better rack utilization, and prevent the use of either active optical cables (AOCs) or active copper cables (ACCs), which are priced much higher than direct attach copper cables (DACs).

In some embodiments, the Clos topology using mesh switch devices may use methods of non-static load balancing, either dynamic or based on probability. Any suitable adaptive routing methods may be used, for example, but not limited to, methods described in U.S. Pat. Nos. 8,576,715, 9,014,006, 9,137,143, and 9,634,940, whose disclosures are incorporated herein by reference.

In some embodiments, a computer network system includes network connections, and a plurality of network switch devices connected via the network connections in a Clos topology arrangement including a lower tier and an upper tier. In some embodiments, the Clos topology arrangement includes two layers. In other embodiments the Clos topology arrangement includes at least three tiers. The network switch devices include leaf switch devices disposed in the lower tier, and spine switch devices disposed in the upper tier. Each leaf switch device is connected by respective ones of the network connections to the spine switch devices. In some embodiments, each leaf switch device is connected to each spine switch device.

At least some of the network switch devices include, or are implemented as, respective mesh switch devices. In other words, respective ones of the network switch devices include, or are implemented as, respective mesh switch devices. In some embodiments, respective ones of the spine switch devices include, or are implemented as, respective mesh switch devices. In some embodiments, respective ones of the leaf switch devices comprise, or are implemented as, respective mesh switch devices. In some embodiments, each network switch device comprises, or is implemented as, a respective mesh switch device.

Each mesh switch device includes at least three internal switches interconnected in a mesh network with each internal switch being connected to each other internal switch via a respective internal network connection. In other words, the internal switches used for forwarding in the mesh switch device are directly connected to each other without intervening switches. The term "mesh network", as used in the specification and claims, is defined as half the ports of each internal switch in the mesh network being configured for connection to nodes external to that mesh network, and the other half of the ports of each internal switch being directly connected to each of the other internal switches in that mesh network with equal distribution. For example, for a mesh network including three ASICs with 40 ports each, 20 ports of each ASIC are configured for connection to nodes external to that mesh network, and 10 ports of each ASIC are connected to one ASIC in that mesh network, and another 10 ports of each ASIC are connected to another ASIC in that mesh network. In some embodiments, each mesh switch device consists of three internal switches. The term "consists", as used in the specification and claims, is defined as the mesh switch device including only three, and no more, internal switches connected in the mesh network of the mesh switch device. Using three internal switches (e.g., ASICs or packages) in a mesh switch device supports a non-blocking topology.

The internal switches may include respective ASICs configured to forward packets responsively to packet destinations in the respective internal switches. Each mesh switch device may include an enclosure or box with the at least three internal switches disposed in the enclosure. Each mesh switch device may include a cooling system (including for example, cooling fins, fans, and temperature sensors) disposed in the enclosure to remove heat generated by the internal switches from the enclosure. Each mesh switch device may include at least one central processing unit configured to implement adaptive routing.

System Description

Reference is now made to FIG. 1, which is a block diagram view of a computer network system 10 constructed and operative in accordance with an embodiment of the present invention. The computer network system 10 includes network connections 12 (only some labeled for the sake of simplicity) (for example, fiber optic cables and/or electrical network cables), and a plurality of network switch devices 14 connected via the network connections 12 in a Clos topology arrangement including a lower tier 16 and an upper tier 18. In some embodiments, the Clos topology arrangement includes two layers, and in other embodiments the Clos topology arrangement includes at least three tiers. The network switch devices 14 include leaf switch devices 20 disposed in the lower tier 16, and spine switch devices 22 disposed in the upper tier 18. Each leaf switch device 20 is connected by respective ones of the network connections 12 to the spine switch devices 22. The network connections 12 may include any suitable network connections or combination thereof, for example, but not limited to, coaxial cables, optical fiber cables, and/or twisted pair cables. FIG. 1 shows one connection between each leaf switch device 20 and each spine switch device 22. In some embodiments, there may be two or more network connections 12 between each leaf switch device 20 and each spine switch device 22. In some embodiments, each leaf switch device 20 is connected to each spine switch device 22, as shown in FIG. 1. The leaf switch devices 20 may be connected to a lower tier of switches or to end-point devices 24 such as servers.

At least some of the network switch devices 14 may comprise, or be implemented as, respective mesh switch devices, described in more detail with reference to FIGS. 2 and 3. In other words, respective ones of the network switch devices 14 comprise, or are implemented as, respective mesh switch devices. In some embodiments, respective ones of the spine switch devices 22 may comprise, or be implemented as, respective mesh switch devices. In some embodiments, respective ones of the leaf switch devices 20 may comprise, or be implemented as, respective mesh switch devices. The network switches which are not mesh switch devices may be single ASIC switches or Clos in a box, for example. In some embodiments, each network switch device 14 may comprise, or be implemented as, a respective mesh switch device.

FIG. 1 shows that each leaf switch device 20 and each spine switch device 22 includes six ports 26 for the sake of simplicity. Only some of the ports 26 are labeled in FIG. 1 for the sake of simplicity. Each leaf switch device 20 is shown with three ports 26 connected to the end-point devices 24, and three ports 26 connected to respective ones of the spine switch devices 22. Each spine switch device 22 is shown with six ports 26 connected to respective ones of the leaf switch devices 20. When the computer network system 10 is implemented, the network switch devices 14 may include more than 6 ports, for example, 48 or 96 ports.

Figure 2:
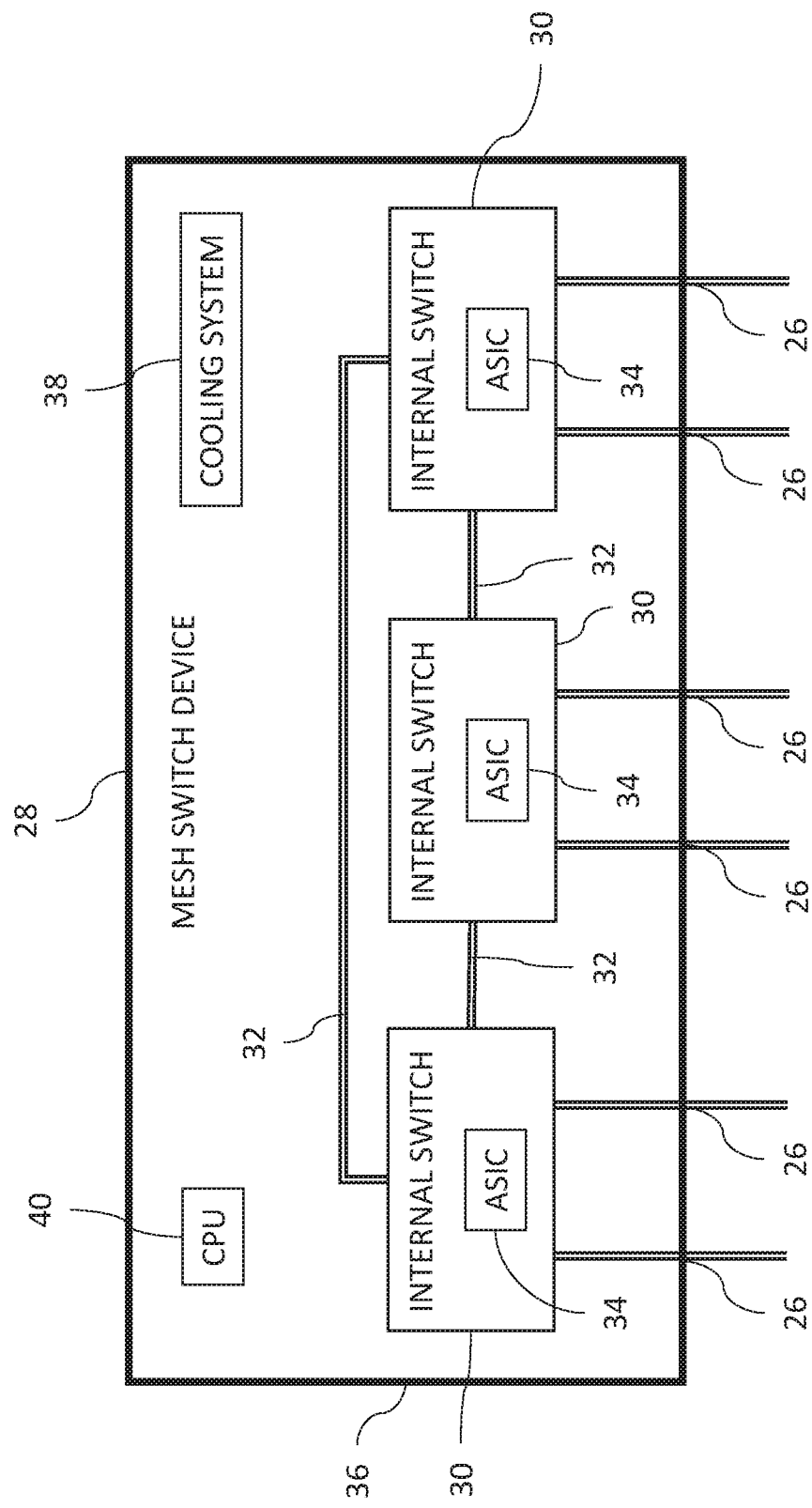
FIG. 2 is a block diagram view of a mesh switch device constructed and operative in accordance with an embodiment of the present invention.

Reference is now made to FIG. 2, which is a block diagram view of a mesh switch device 28 constructed and operative in accordance with an embodiment of the present invention. Each mesh switch device 28 includes at least three respective internal switches 30 (e.g., ASICs or switch packages) interconnected in a respective mesh network with each respective internal switch 30 being connected to each other respective internal switch 30 via a respective internal network connection 32. The internal network connections 32 may include any suitable network connections or combination thereof, for example, but not limited to, connections on a printed circuit board (PCB) on which the internal switches 30 are comprised, coaxial cables, optical fiber cables, and/or twisted pair cables. Therefore, each mesh switch device 28 includes a respective mesh network. In other words, the respective internal switches 30 used for forwarding in the mesh switch device 28 are directly connected with each other without intervening switches. The term "respective", as used in the specification and claims, when used in conjunction with the term "internal switch" or "internal switches" or "internal network connection" refers to an element of a corresponding mesh switch device and/or a corresponding mesh network. In some embodiments, each mesh switch device 28 consists of three respective internal switches 30. The term "consists", as used in the specification and claims, is defined as the mesh switch device 28 including only three, and no more, internal switches 30 connected in the mesh network of that mesh switch device 28. The mesh switch device 28 shown in FIG. 2 includes six network interface ports 26 to connect the mesh switch device 28 to other devices in the network, e.g., to other mesh switch devices 28, or network switch devices 14 (FIG. 1), or end-point devices 24 (FIG. 1). When the mesh switch device 28 is implemented, the mesh switch device 28 may include more than six ports 26, for example, 48 or 96 ports.

The respective internal switches 30 in each mesh network include the ports 26, where a first half of the ports 26 of the respective internal switches 30 are connected to nodes external to that respective mesh network, and a second half of the ports 26 of the respective internal switches 30 are directly connected to each other respective internal switch 30 in the respective mesh network with equal distribution among the respective internal switches 30. In the example of FIG. 2, each internal switch 30 has a radix of 4 with two ports of each internal switch 30 being available for connection to the other devices in the computer network system 10 via the ports 26, and two ports of each internal switch 30 being connected to the other internal switches 30 in that mesh switch device 28. Therefore, connecting three internal switches 30 in a mesh network, each respective internal switch 30 with a radix of 4, provides the respective mesh switch device 28 with six ports 26. In general, the internal connectivity is implemented such that half of the ports of each internal switch 30 are used for the ports 26 going out of the respective mesh switch device 28, one quarter to one of the other respective internal switches 30, and an additional quarter to yet another one of the respective internal switches 30.

The internal switches 30 may comprise respective application-specific integrated circuits (ASICs) 34 configured to forward packets responsively to packet destinations in the respective internal switches 30. Each ASIC consists of network ports 26 with each port 26 of that ASIC using a same forwarding protocol, e.g., Ethernet, IP or InfiniBand. In other words, all the network ports 26 of an ASIC use the same forwarding protocol.

Packets forwarded in one mesh switch device 28 from one respective internal switch 30 to another may be forwarded directly to the destination internal switch 30 or indirectly via another respective internal switch 30 of that mesh switch device 28. In this manner, the mesh switch device 28 generally provides the required bandwidth. However, with more than three internal switches 30 in the mesh switch device 28, the required bandwidth may not be provided in all cases.

Each mesh switch device 28 may include a respective enclosure 36 or box with the respective internal switches 30 disposed in the respective enclosure 36. Each mesh switch device 28 may comprises a respective cooling system 38 disposed in the respective enclosure 36 to remove heat generated by the respective internal switches 30 (and other components) from the respective enclosure.

Each mesh switch device 28 (or each mesh network) may comprise at least one respective central processing unit 40 configured to provide shared services to the respective internal switches 30 of that mesh switch device 28 (or that mesh network). Each mesh switch device 28 (or each mesh network) comprises respective internal forwarding elements (e.g., the internal switches 30), and is configured to implement adaptive routing between the respective internal forwarding elements of that respective mesh switch device 28. Any suitable adaptive routing methods may be used, for example, but not limited to, methods described in U.S. Pat. Nos. 8,576,715, 9,014,006, 9,137,143, and 9,634,940, whose disclosures are incorporated herein by reference. In practice, some or all of the functions of the central processing unit 40 may be combined in a single physical component or, alternatively, implemented using multiple physical components. These physical components may comprise hardwired or programmable devices, or a combination of the two. In some embodiments, at least some of the functions of the central processing unit 40 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Figure 3:
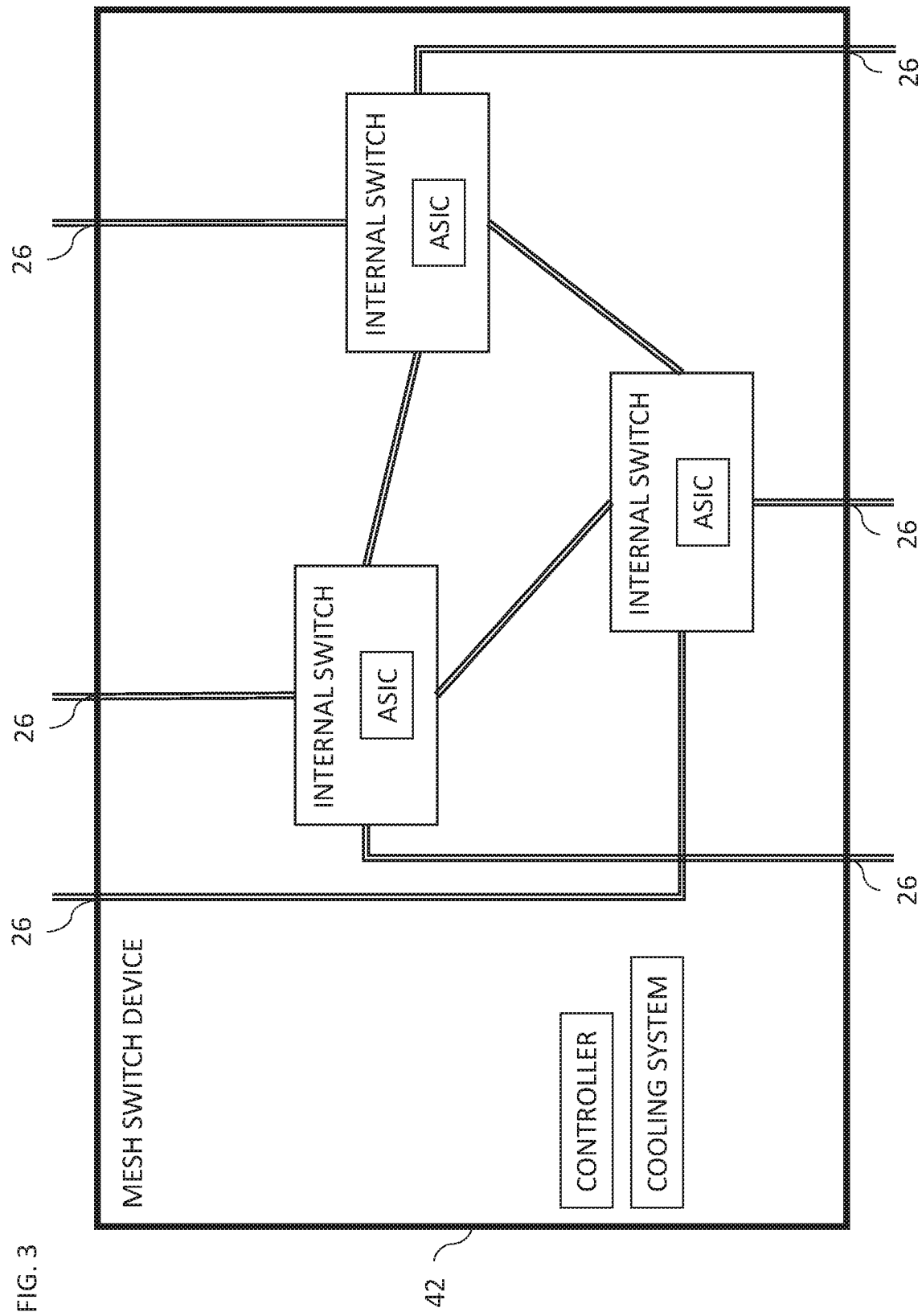
FIG. 3 is a block diagram view of an alternative mesh switch device constructed and operative in accordance with an embodiment of the present invention.

Reference is now made to FIG. 3, which is a block diagram view of an alternative mesh switch device 42 constructed and operative in accordance with an embodiment of the present invention. The mesh switch device 42 and the mesh switch device 28 are two logical diagrams representing the same device. The mesh switch device 42 is the same as the mesh switch device 28, except that the ports 26 of the mesh switch device 42 are shown exiting the mesh switch device 42 from different sides for the sake of convenience when depicting the mesh switch devices 28, 42 in FIGS. 4-7.

Figure 4:
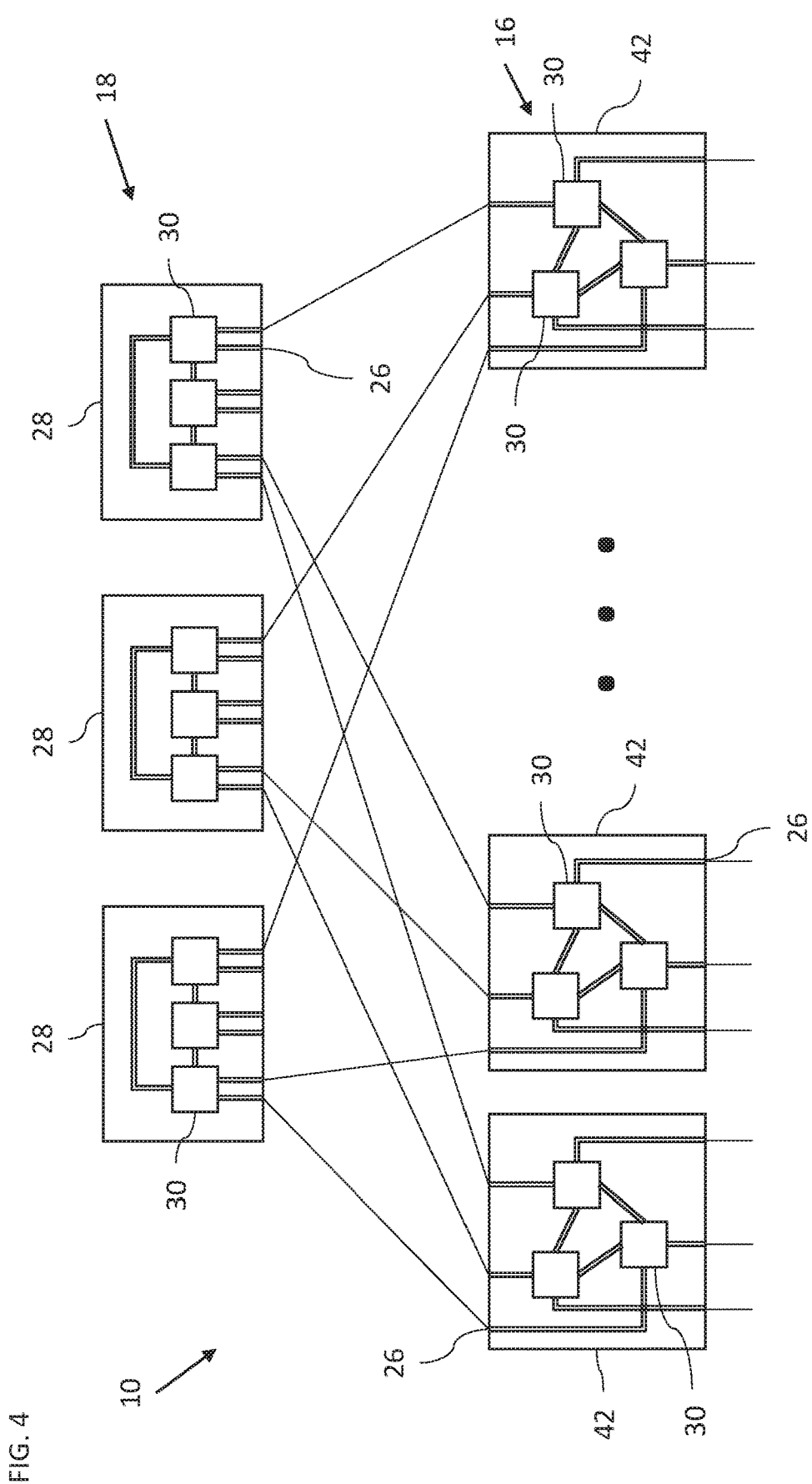
FIG. 4 is a block diagram view of the computer network system of FIG. 1 showing more details of the mesh switch devices.

Reference is now made to FIG. 4, which is a block diagram view of the computer network system 10 of FIG. 1 showing details of the mesh switch devices 28, 42. Using the building blocks of the mesh switch devices 28, 42 and applying a single management plane within the computer network system 10 may enables an operator to benefit from the topology while operating with the same deployment models and routing (physical and logical) algorithms that are already in use in most of the currently deployed networks, in particular Clos networks.

The computer network system 10 shown in FIG. 4 shows each mesh switch device 28, 42 including three respective internal switches 30 (only some labeled for the sake of simplicity) with 4-port radix per internal switch 30 so that each mesh switch device 28, 42 has six external ports 26 (only some labeled for the sake of simplicity). Each mesh switch device 28 in the upper tier 18 is connected to six of the mesh switch devices 42 in the lower tier 16. Each mesh switch device 42 in the lower tier 16 may be connected to three end-point devices 24 (FIG. 1). Therefore, the computer network system 10 shown in FIG. 1 would allow connecting eighteen end-point devices 24 (e.g., servers).

The computer network system 10 shown in FIG. 4 may be compared to a two-tier Clos network connecting 4-port radix switches, which would allow connecting only eight servers.

When the computer network system 10 is implemented, the mesh switch devices 28, 42 may each include more than 6 ports, for example, 48 or 96 ports.

Figure 5:
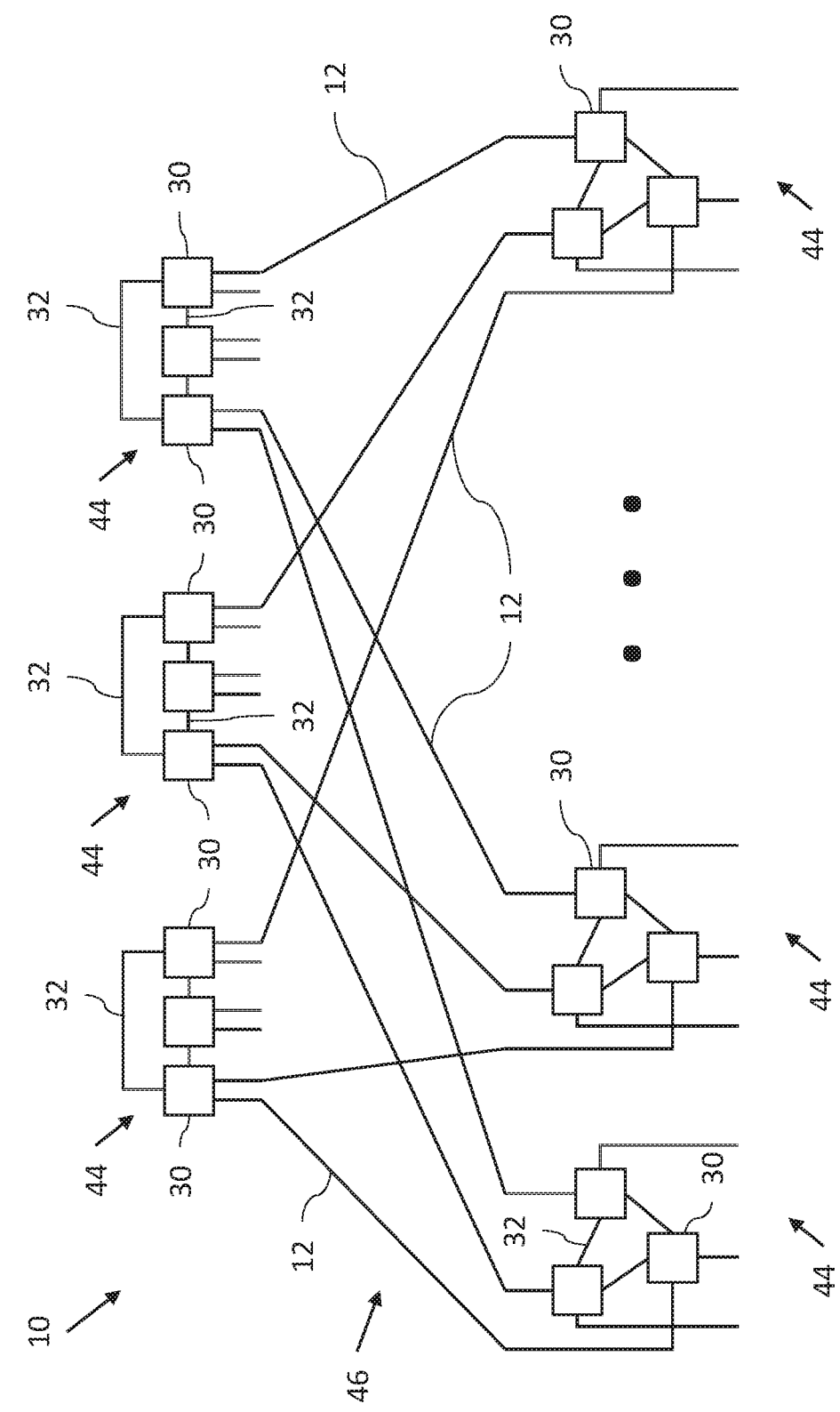
FIG. 5 is a block diagram view of the computer network system of FIG. 4 without the mesh switch device enclosures.

Reference is now made to FIG. 5, which is a block diagram view of the computer network system 10 of FIG. 4 without the mesh switch device enclosures 36 (FIG. 2). The computer network system 10 of FIG. 5 illustrates that ignoring the enclosures 36, the computer network system 10 comprises multiple mesh networks 44 (of respective internal switches 30 (only some labeled for the sake of simplicity)) connected via a Clos topology 46.

In particular, FIG. 5 shows that computer network system 10 includes mesh networks 44, with each mesh network 44 including at least three interconnected respective internal switches 30, with each respective internal switch 30 being connected to each other respective internal switch 30 via a respective internal network connection 32 (only some labeled for the sake of simplicity). FIG. 5 also shows that the computer network system 10 includes Clos topology network connections 12 (only some labeled for the sake of simplicity) connecting the mesh networks 44 in a Clos topology arrangement. In some embodiments, as shown in FIG. 5, each mesh network 44 consists of three respective internal switches 30. A first half of the ports of the respective internal switches 30 of each respective mesh network 44 are connected to nodes external to that respective mesh network 44, and a second half of the ports of the respective internal switches 30 of that respective mesh network 44 are directly connected to each other respective internal switch 30 in that respective mesh network 44 with equal distribution among the respective internal switches 30 of that respective mesh network 44.

Figure 6:
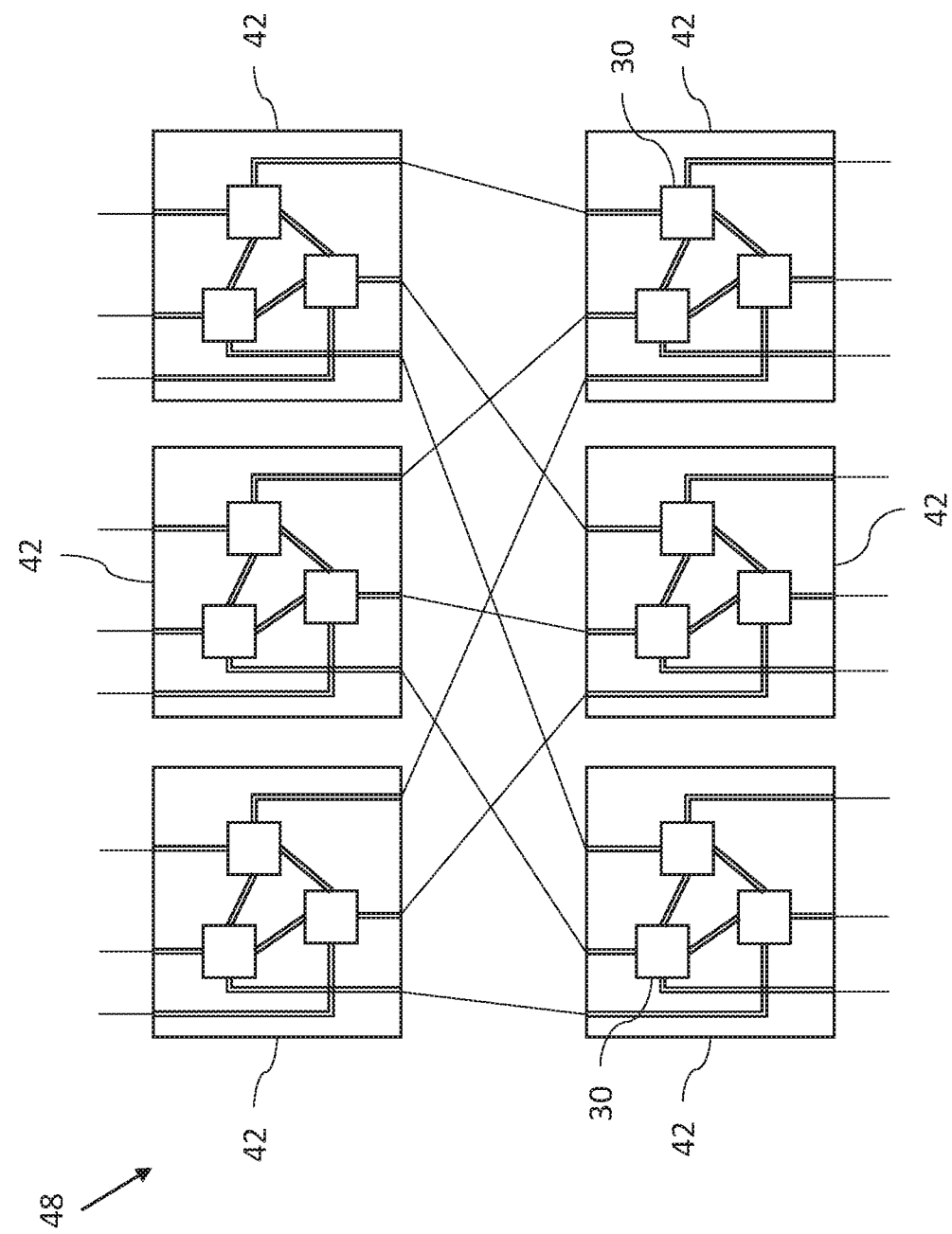
FIG. 6 is a block diagram view of a pod constructed and operative in accordance with an embodiment of the present invention.

Reference is now made to FIG. 6, which is a block diagram view of a pod 48 constructed and operative in accordance with an embodiment of the present invention. FIG. 6 shows creating the pod 48 using six mesh switch devices 42 providing connection to nine servers (not shown). Each respective internal switch 30 (only some shown for the sake of simplicity) used in the mesh switch devices 42 has a radix of four. Each internal switch 30 may have any suitable radix. By way of example, if each internal switch 30 has a radix of eight, then the pod 48 would connect $[(8\times1.5)/2]*[(8\times1.5)/2]=36$ servers, while a "simple" clos topology with single ASIC switches would connect $(8/2)\times(8/2)=16$ servers.

Figure 7:
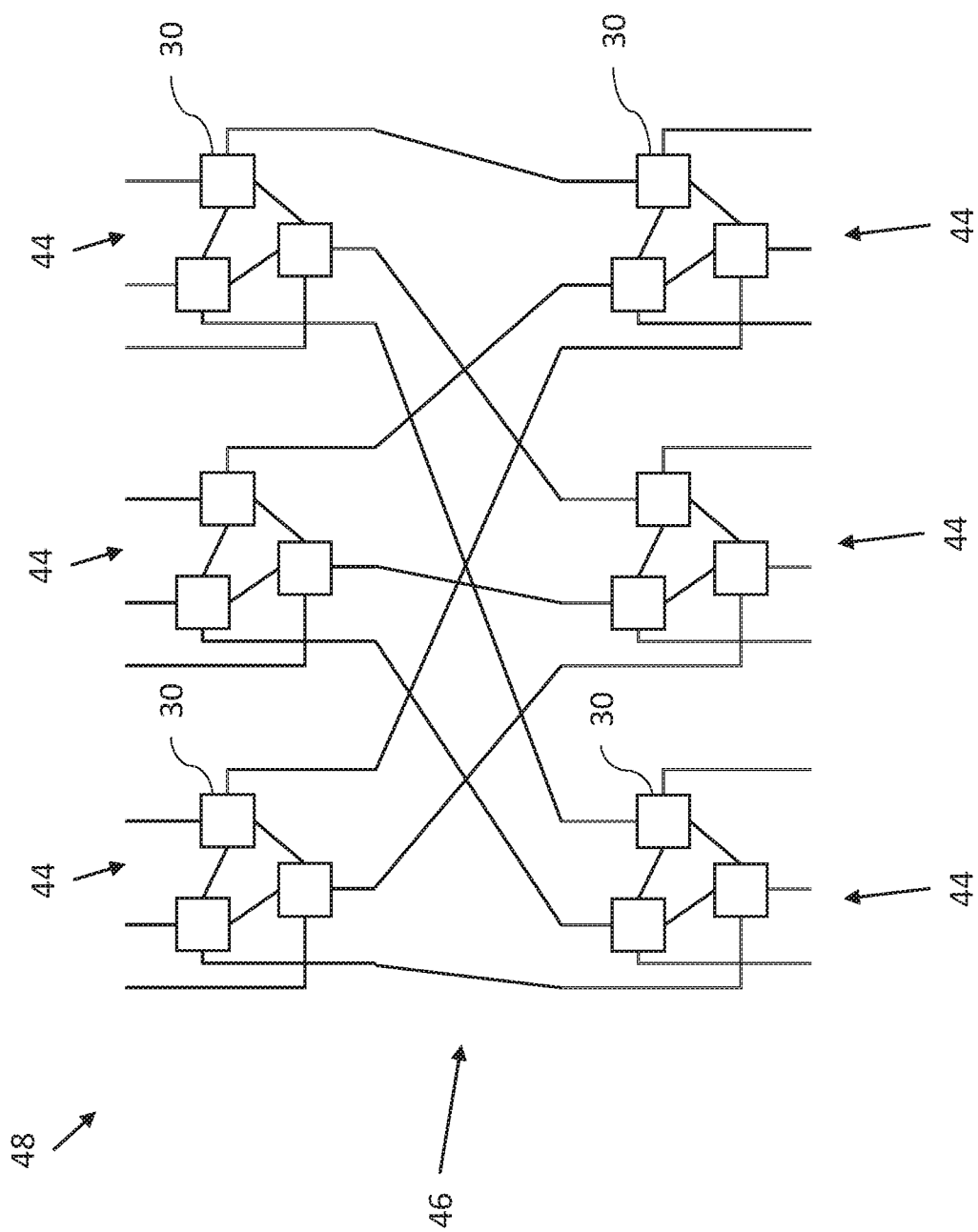
FIG. 7 is a block diagram view of the pod of FIG. 6 without the mesh switch device enclosures.

Reference is now made to FIG. 7, which is a block diagram view of the pod 48 of FIG. 6 without the mesh switch device enclosures 36 (FIG. 2). The pod 48 of FIG. 7 illustrates that ignoring the enclosures 36, the pod 48 comprises multiple mesh networks 44 (of internal switches 30 (only some labeled for the sake of simplicity)) connected via a Clos topology 46.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A computer network system, comprising:
   a plurality of mesh networks, each mesh network including at least three interconnected respective internal switches with each respective internal switch being connected to each other one of the respective internal switches via a respective internal network connection; and
   Clos topology network connections connecting the mesh networks in a Clos topology arrangement.

2. The system according to claim 1, wherein the respective internal switches comprise respective application-specific integrated circuits (ASICs) configured to forward packets responsively to packet destinations in the respective internal switches.

3. The system according to claim 2, wherein each ASIC consists of network ports, each of the ports using a same forwarding protocol.

4. The system according to claim 1, wherein each mesh network consists of three of the respective internal switches.

5. The system according to claim 1, further comprising a plurality of network switch devices connected via the Clos topology network connections, the Clos topology arrangement including a lower tier and an upper tier, the network switch devices comprising leaf switch devices disposed in the lower tier, and spine switch devices disposed in the upper tier, each of the leaf switch devices being connected by respective ones of the network connections to the spine switch devices, respective ones of the leaf switch devices comprising respective mesh switch devices, each mesh switch device including a respective one of the mesh networks.

6. The system according to claim 5, wherein each mesh switch device consists of three of the respective internal switches.

7. The system according to claim 5, wherein respective ones of the spine switch devices comprise respective ones of the mesh switch devices.

8. The system according to claim 5, wherein each of the network switch devices comprises a respective one of the mesh switch devices.

9. The system according to claim 5, wherein each respective mesh switch device comprises a respective enclosure with the three respective internal switches disposed in the respective enclosure.

10. The system according to claim 9, wherein each respective mesh switch device comprises a respective cooling system disposed in the respective enclosure to remove heat generated by the three respective internal switches from the respective enclosure.

11. The system according to claim 5, wherein respective ones of the spine switch devices comprise respective ones of the mesh switch devices.

12. The system according to claim 5, wherein respective ones of the network switch devices comprise respective ones of the mesh switch devices.

13. The system according to claim 5, wherein each of the network switch devices comprises a respective one of the mesh switch devices.

14. The system according to claim 5, wherein each respective mesh switch device comprises a respective enclosure with the at least three respective internal switches disposed in the respective enclosure.

15. The system according to claim 14, wherein each respective mesh switch device comprises a respective cooling system disposed in the respective enclosure to remove heat generated by the at least three respective internal switches from the respective enclosure.

16. The system according to claim 1, wherein the Clos topology arrangement includes at least three tiers.

17. The system according to claim 1, wherein each mesh network comprises respective internal forwarding elements, and is configured to implement adaptive routing between the respective internal forwarding elements of a respective one of the mesh networks.

18. The system according to claim 1, wherein each mesh network includes a central processing unit configured to provide shared services to the at least three respective internal switches.

19. The system according to claim 1, wherein the respective internal switches in each respective mesh network includes ports, a first half of the ports of the respective internal switches are connected to nodes external to the respective mesh network, and a second half of the ports of the respective internal switches are directly connected to each of other ones of the respective internal switches in the respective mesh network with equal distribution among the respective internal switches.

* * * * *